United States Patent [19]

Winders

[11] 3,769,158

[45] Oct. 30, 1973

[54] END FITTING RETAINER FOR NUCLEAR FUEL ASSEMBLY

[75] Inventor: Gordon R. Winders, Olney, Md.

[73] Assignee: Nuclear Fuel Services, Inc., Rockville, Md.

[22] Filed: Nov. 24, 1971

[21] Appl. No.: 201,927

[52] U.S. Cl.......................... 176/78, 176/66, 176/79
[51] Int. Cl............................................. G21c 3/32
[58] Field of Search ..................... 176/78, 66, 79, 76

[56] References Cited
UNITED STATES PATENTS

| 3,276,967 | 10/1966 | Dodd | 176/78 |
| 3,331,749 | 7/1967 | Anthony et al. | 176/78 |
| 3,379,618 | 4/1968 | Frisch | 176/78 |
| 3,475,273 | 10/1969 | Krawiec | 176/78 |

Primary Examiner—Reuben Epstein
Attorney—Bacon & Thomas et al.

[57] ABSTRACT

A nuclear reactor core fuel assembly has upstanding support rods supporting an end fitting over the fuel rods. The support rods have reduced necks extending through openings in the end fitting with resilient split rings in grooves and engaging the end fitting. The rings may be flexed by a special tool for removal of the end fitting or may be flexed by the end fitting when lowered thereon.

10 Claims, 9 Drawing Figures

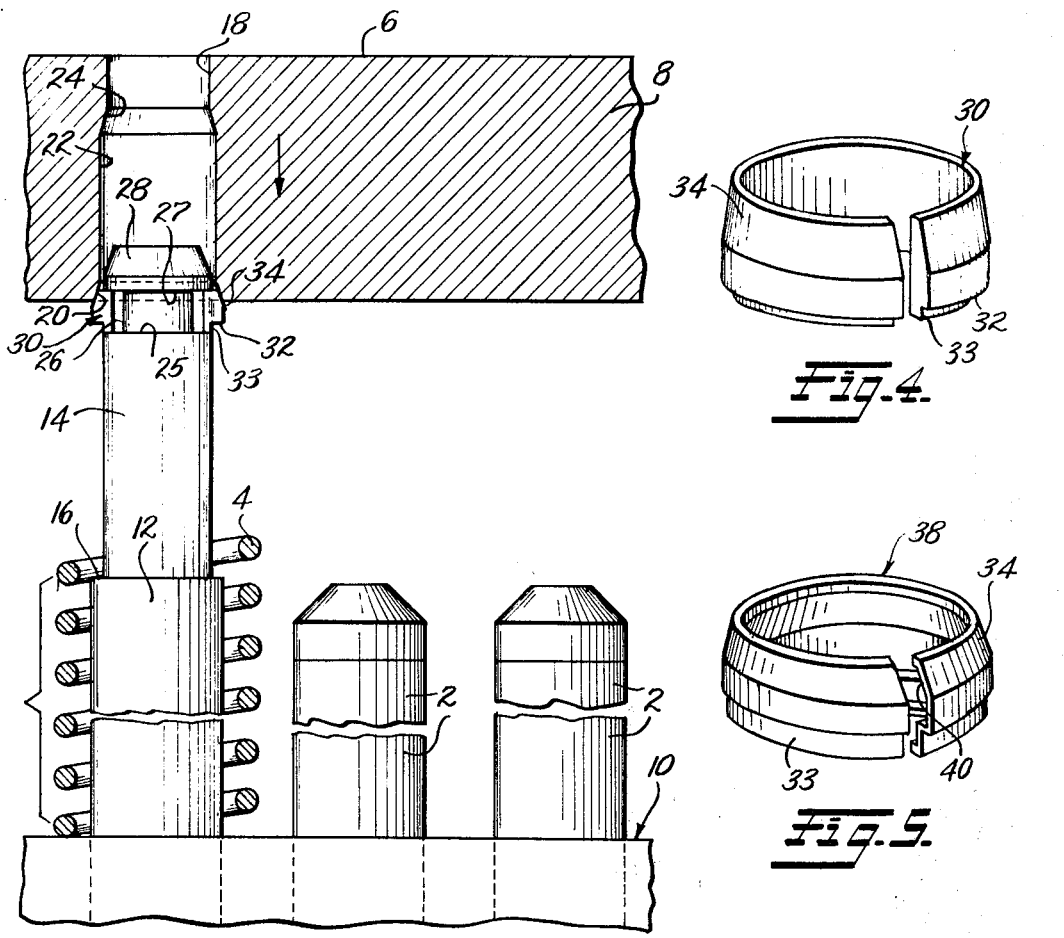
Fig.4.
Fig.5.
Fig.1.
Fig.2.
Fig.3.
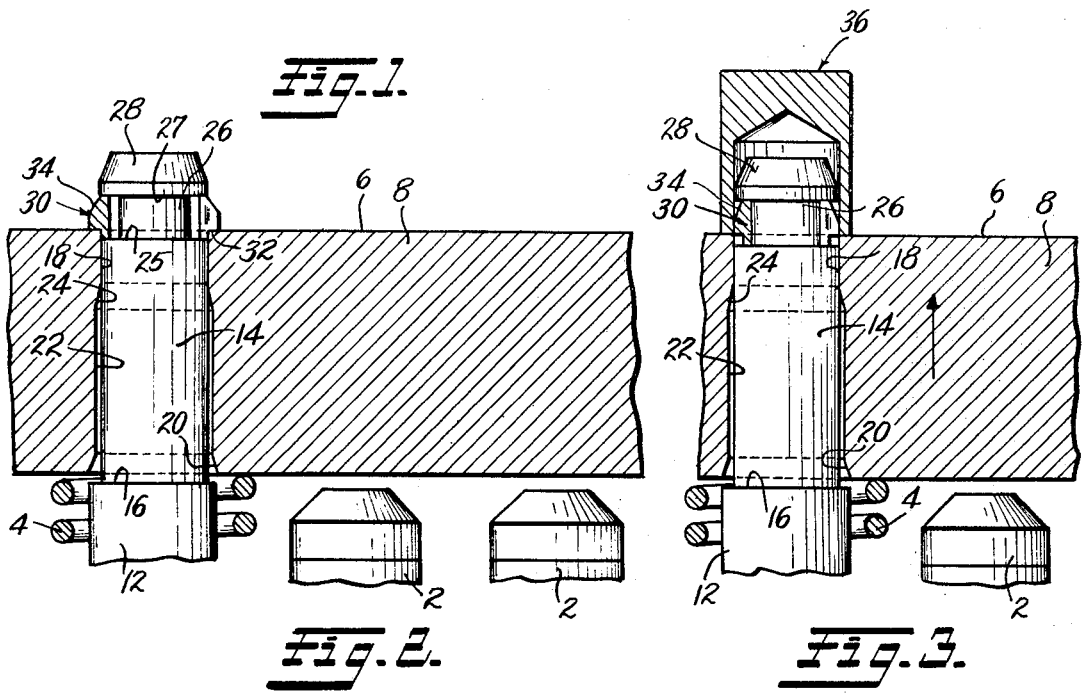

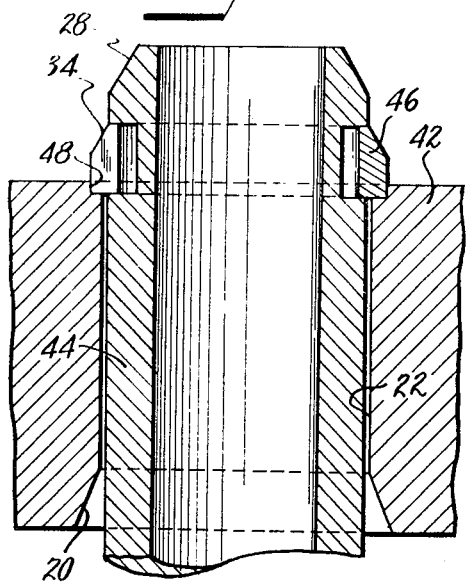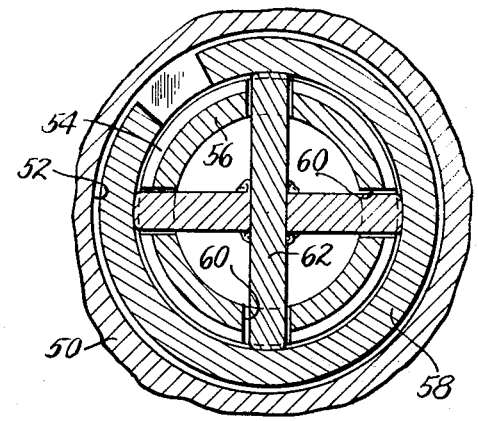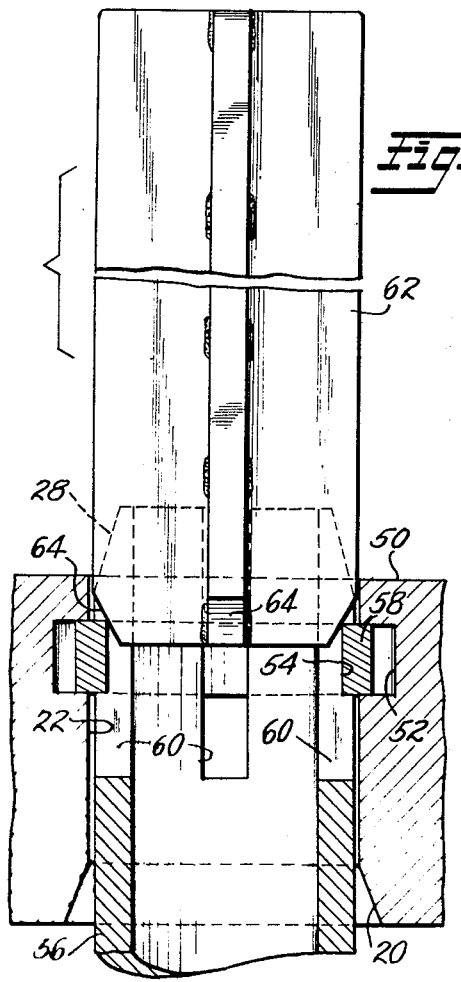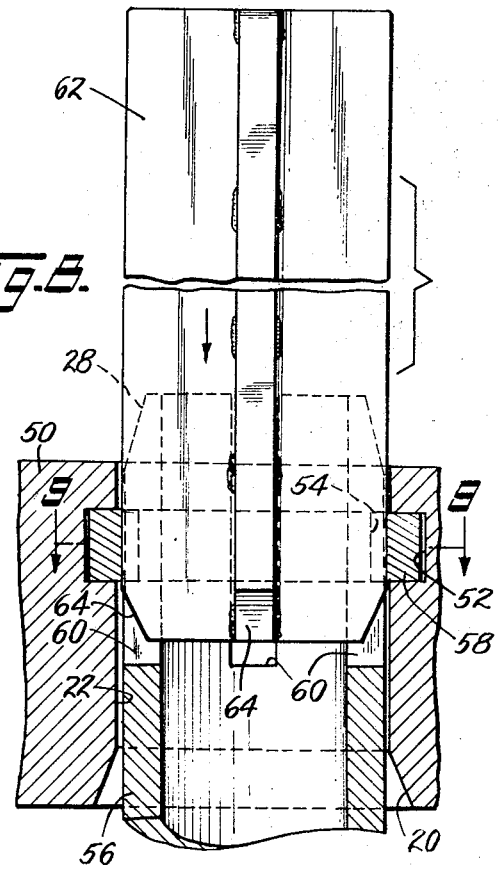

END FITTING RETAINER FOR NUCLEAR FUEL ASSEMBLY

BACKGROUND OF THE INVENTION

This invention is in the field of nuclear reactor fuel core assemblies. It has been common practice to preassemble, by welding, a fuel assembly for nuclear reactors wherein a multiplicity of elongated fuel containing rods are arranged in parallel relationship and held in spaced relation by a plurality of spacer grids. The grids are conventionally secured to longitudinally extending frame members or support rods, which are also fixed to end fittings extending across the ends of the fuel rods to retain them in position. In the vent of individual fuel rod failure, it has been conventional practice to replace the entire fuel assembly. It has been impractical to remove one of the end fittings, for example, the upper one, to replace individual fuel rods due to the welded construction of the fuel assembly.

SUMMARY OF THE INVENTION

The present invention relates to a fuel assembly wherein an upper end fitting can be readily installed or removed from a fuel assembly by remote tooling in a water pool. In general, the members serving as support rods for the upper end fitting are provided with a neck portion extending through an opening in the end fitting and a snap ring to hold the fitting in its assembled position. The snap ring is a split spring ring in a groove in the neck, which normally overlies a portion of the retainer plate to hold it in place. The split ring is so constructed that a sleeve or other tool can be pressed downwardly thereon to compress the same to a diameter smaller than that of the opening through which the neck passes so that the end fitting and sleeve can then be lifted free of the core fuel assembly. In another form the tool expands the ring into a groove in the end fitting. It is contemplated that a single remotely controlled mechanism be provided to be lowered onto the end fitting to grasp the same for lifting purposes and in so lowering the mechanism, tools attached thereto effect flexure of the snap rings.

BRIEF DESCRIPTION OF THE DRAWINGS

FIG. 1 is a schematic view showing an end fitting being lowered onto a core assembly;

FIG. 2 is a view of a portion of FIG. 1 with the end fitting in its seated position;

FIG. 3 is a view similar to FIG. 2 but showing a release sleeve holding the split ring compressed;

FIG. 4 is a perspective view of the split ring of FIGS. 1-3;

FIG. 5 is a perspective view of a modified form of split ring;

FIG. 6 is a schematic sectional view showing a modification of the invention of FIGS. 1-5;

FIG. 7 is a fragmentary schematic view of a different embodiment of the invention;

FIG. 8 is a sectional view similar to FIG. 7 showing the parts in different relative positions; and FIG. 9 is a transverse sectional view taken on the line 9—9 of FIG. 8.

DESCRIPTION OF A PREFERRED EMBODIMENT

In the drawings, numerals 2 indicate the fuel rods in a nuclear reactor having more or less conventional upper end structures retained by end fitting plate 8 urged upwardly by compression or support springs 4.

The upper end fitting plate 8 is shown in the drawings in simplified form and may be of other configurations than that shown. The elements identified herein as fuel rods 2 may in fact be moderating material, water tubes or the like, in addition to fuel rods.

As indicated schematically in FIG. 1, the fuel rods 2 are held in spaced relationship by the usual grid structures indicated generally at 10 in FIG. 1.

A plurality of support rods 12 also extend parallel to the fuel rods 2 and serve as frame members to hold the assembly in the desired relationship and to hold the springs 4 in place. While the description herein refers to support rods 12, it is understood that they may perform other functions also, such as being water tubes, control rod guides or serving only as frame members. Conventionally, a plurality of the support rods 12 are provided, for example, one in each corner of a rectangular or square assembly.

Each support rod 12 is provided with a neck portion 14 of reduced diameter at its upper end and terminating at its lower end in an upwardly facing shoulder 16. As shown, the end fitting 8 is provided with openings 18 therethrough and through which the neck portions 14 extend. As shown, the openings 18 each include a lower bevelled edge 20, a first opening porion 22 of larger diameter than the neck 14, an upper bevelled portion 24, and the upper cylindrical portion 18 fairly snugly receiving the neck 14. The neck 14 is provided with a circumferential groove 26 near its upper end, the groove having spaced parallel upper and lower side wall surfaces 25 and 27 The portion of the neck above the groove 26 is preferably tapered as at 28 to assist in guiding the same into the openings 18. Seated within the groove 26 is a split ring of spring metal 30. FIGS. 1 and 2 show the split ring in its expanded condition wherein its inner diameter is substantially greater than the diameter of the bottom of groove 26 but less than the diameter of the neck 14 and wherein its outer diameter is greater than the diameter of the opening 18 in retainer plate 8. The parts are so dimensioned and positioned that when the end fitting 8 is in its seated position, as shown in FIG. 2, the split ring 30 can expand outwardly so that a shoulder 32 thereon overlies and bears against the upper surface of the end fitting 8 while the radially inner portion of the split ring extends into the groove 26 and its ends bear against the upper and lower side walls 25 and 17 of the groove 26. As shown, the split ring 30 is provided with a sleeve portion 33 extending downwardly into the opening 18 when the end fitting 8 is in the position of FIG. 2 and this prevents undue expansion or distortion of the split ring 30, ensuring that it remains in position to lock the end fitting in the position of FIG. 2. As also shown, the split ring 30 includes an upper, tapered or conical surface portion 34. Assuming the end fitting 8 to be separated from the core fuel assembly and it is desired to place the same thereon, the end fitting is merely lowered onto the assembly in position so that the tapered surfaces 28 guide the neck portions 14 into openings 18. When the parts reach the position shown in FIG. 1, the bevelled surface 20 of the end fitting engages the conical surface 34 of the split ring and the weight of the end fitting and its remote handling tool are normally sufficient to compress the support springs 4 and to cam the portions of the split ring radially inwardly to compress the same within the groove 26 until the outer diameter of the split ring has been reduced sufficiently to enter the lower portion 22 of opening 18. Continued lowering of the end fitting then engages tapered surface 24 with surface 34 of the split ring and further compresses the same until its outer diameter is small enough to enter the upper portion of opening 18 and to pass therethrough until the end fitting reaches the position of FIG. 2 whereupon the split ring 30 resiliently expands outwardly to the position shown in FIG. 2 and the end fitting is then locked in position.

When it is desired to remove the end fitting 8, a release sleeve 36 (FIG. 3) may be forced downwardly over each split ring 30 to compress the same to an outer diameter no greater than that of the opening 18 and if the end fitting 8 and release sleeve 36 are then moved upwardly together, the support springs 4 supplying the lifting force, the compressed split ring 30 can freely slide downwardly into the opening 18 and the end fitting thus lifted from the fuel assembly. It is contemplated that remotely controlled mechanism will be provided for engaging and lifting or lowering the end fitting 8 and such mechanism may include, as a fixed part thereof, a release sleeve 36 for each of the support rods 12 for that particular end fitting and thus a single movement of the mechanism can be made to compress all split rings 30 and effect lifting engagement with the end fitting 8 for removal thereof. In placing the end fitting 8 into position, after the parts are lowered to the position of FIG. 3, the lifting mechanism may be disengaged from the end fitting 8 and when it is lifted therefrom, it also removes the release sleeves 36 upwardly to thereby permit the split rings 30 to expand and assume the position shown in FIG. 2 wherein the end fitting 8 is locked in positon.

The force necessary to compress the split ring 30 may be reduced by forming the ring in the manner shown in FIG. 5, wherein a split ring 38 is provided with the sleeve 33, as already described, but is circumferentially undercut at 40, to reduce the spring rate, requiring less force to compress radially than the form of ring shown in FIG. 4 and involving less pressure at the sloping or conical surface 34. Such a form of split ring may be advantageous for the metal employed for the end fitting 8 may be subject to distortion under undue pressure.

In the embodiment shown in FIG. 6, the end fitting plate 42 may be substantially identical to that shown in FIG. 1 but is shown herein in slightly modified form. The neck portion 44 of the support rod is shown as a tubular member and the split ring 46 does not include a depending central sleeve, such as the sleeve 33 of FIG. 1. In this form of the invention, the end fitting is provided with a counterbore 48 in which the lower end of the split ring 46 engages the periphery of the counterbore, thus retaining the split ring against further outward movement, for the same reasons as set forth with reference to FIG. 1.

In the modification illustrated in FIGS. 7, 8 and 9, the end fitting plate 50 is similar to that shown in FIG. 6 but instead of the counterbore 48, the plate 50 is provided with an internal circumferential groove 52 between the ends of the opening 22 and when the end fitting is in position on the assembly, the internal groove 52 is radially aligned with an external groove 54 in the neck portion 56 of a support member. Seated in the groove 52 is a split spring ring 58, which also engages the side walls of the groove 54 in the position shown. The resilient spring ring 58 normally tends to contract to seat firmly against the bottom of the groove 54 in neck portion 56 but even when so seated its radial dimension is sufficient to extend into the groove 52 and engage at least the upwardly facing surface of the bottom side wall of that groove to lock the end fitting in place, in the manner already described. The wall of the tubular neck portion 56 is provided with opposed slots 60 which are obviously in communication with the groove 54. When it is desired to release the end fitting 50 for removal from the assembly, a tool such as the X-shaped assembly of plates 62 is inserted into the open upper end of the tubular end portion 56 and pressed downwardly therein, with the edges of the plates moving downwardly in slots 60. As shown, the lower corners of the tool 62 are bevelled, as at 64, so as to engage the inner edge of split ring 58. When the tool 62 is forced downwardly from the position shown in FIG. 7, the split ring 58 is caused to expand radially into the groove 52 so that the inner diameter of that ring is then at least as great as the outer diameter of the neck portion 56. This condition is shown in FIG. 8. Thus, if the tool is inserted in the position of FIG. 8, the tool and end fitting 50 can then be lifted upwardly and removed from the support having the neck portion 56. As in the case described with reference to FIGS. 1–3, a tool such as the tool 62 may be fixedly secured to appropriate lifting mechanism and when the parts reach the relative positions of FIG. 8, the lifting mechanism will have engaged appropriate devices on the end fitting 50 so that upward movement of the lifting device will remove the end fitting from its supports.

When the end fitting 50 is free of the assembly, including the neck portions 56, and the tool 62 is not in the position shown in FIG. 8, the ring 58 will have contracted radially to about the diameter shown in FIG. 7 wherein its inner portion projects into the opening 22. The mere lowering of the end fitting 50 over the tubular neck portion 56 will cause the upper end surface 28 of the neck portion to engage the inner corner of the ring 58 and further downward movement of the end fitting will cause the surface 28 to cam the ring 58 outwardly to the position of FIG. 8, and when the end fitting reaches its desired seated position, the ring 58 will contract into the groove 54 and thus lock the parts together.

While a limited number of embodiments of the basic invention concept are shown herein, the same are merely illustrative of the principles involved and other forms may be resorted to within the scope of the appended claims.

1. In a nuclear reactor fuel assembly having a plurality of upstanding fuel rods, an end fitting extending across the tops of said fuel rods to retain the same in position, and support means holding said end fitting in position, the improvement comprising:

an opening through said end fitting in vertical alignment with said support means;

said support means having a neck portion extending upwardly in said opening;

a circumferential groove around said neck portion; and a radially flexible resilient annular member in said groove having its radially inner portion in said groove and an outer portion overlying and engaging an upwardly facing surface portion of said end fitting, said resilient member being flexibly distortable to a diameter to substantially disengage from one of said end fitting and support means for removal of said end fitting from said support means.

2. A nuclear reactor fuel assembly defined in claim 1 wherein said annular member comprises a split ring of spring metal having upper and lower end surfaces slidably engaging the axial ends of said groove.

3. A nuclear reactor fuel assembly as defined in claim 2 wherein said lower end surfaces comprises the lower end of a portion of said ring extending within said opening.

4. A nuclear reactor fuel assembly as defined in claim 2 wherein at least the upper portion of said annular member extends above said end fitting and is of generally conical, upwardly tapering, shape whereby a sleeve member may be forced downwardly over said annular member and cam the same inwardly into said groove.

5. A nuclear reactor fuel assembly as defined in claim 4 wherein the lower end of said opening is chamfered whereby said end fitting, when separated from said support means, may be lowered over said neck portion to cause said chamfered end to cam said annular member into said groove for passage through said opening and subsequent expansion into retaining engagement with said upper surface portion of said end fitting.

6. A nuclear reactor fuel assembly as defined in claim 1 wherein said support means is provided with an upwardly facing shoulder below and engageable with said end fitting to limit downward movement thereof on said neck portion.

7. A nuclear reactor fuel assembly as defined in claim 2 wherein said ring normally expands to an outer diameter greater than that of said neck portion and is contractible to an outer diameter no greater than that of said neck portion.

8. A nuclear reactor fuel assembly as defined in claim 2 wherein said ring normally contracts to an inner diameter less than and an outer diameter greater than said neck portion, said upwardly facing surface portion of said end fitting being defined by a side of an internal groove between the ends of said opening, the depth of said internal groove being sufficient for said ring to be radially expanded therein to an internal diameter at least as large as the diameter of said neck portion.

9. A nuclear reactor fuel assembly as defined in claim 8 wherein at least said neck portion is provided with passageway, from its upper end, communicating with the groove in said neck portion whereby to render said ring accessible for applying a radial expanding force thereto.

10. In a nuclear reactor fuel assembly having a plurality of upstanding fuel rods, support means, an end fitting on said support means and extending across the tops of said fuel rods, and cooperating means between said end fitting and support means for holding said end fitting seated on said support means, the improvement comprising:

resiliently movable means on one of said end fitting and support means, biased to engage the other to hold said end fitting seated on said support means, said resiliently movable means being aceessible from above said end fitting forcible flexure to a release position to permit upward removal of said end fitting from said support means; and cooperating camming surfaces on said resiliently movable means and said other one of said end fitting and support means whereby said end fitting may be lowered toward said supoort means and thereby cause said surfaces to move said resiliently movable means to release position until said end fitting substantially seats on said support means.

* * * * *